(12) United States Patent
Ishitsuka et al.

(10) Patent No.: US 7,089,458 B2
(45) Date of Patent: Aug. 8, 2006

(54) METHOD FOR DETECTING FAILURE WHEN INSTALLING INPUT-OUTPUT CONTROLLER

(75) Inventors: Seiichi Ishitsuka, Tokyo (JP); Soichi Ishihara, Tokyo (JP)

(73) Assignee: NEC Corporation, Tokyo (JP)

( * ) Notice: Subject to any disclaimer, the term of this patent is extended or adjusted under 35 U.S.C. 154(b) by 604 days.

(21) Appl. No.: 10/337,852

(22) Filed: Jan. 8, 2003

(65) Prior Publication Data
US 2003/0131289 A1 Jul. 10, 2003

(30) Foreign Application Priority Data
Jan. 8, 2002 (JP) .............................. 2002-001332

(51) Int. Cl.
*G06F 11/00* (2006.01)
(52) U.S. Cl. ...................................................... 714/43
(58) Field of Classification Search ................ 714/43, 714/44
See application file for complete search history.

(56) References Cited
U.S. PATENT DOCUMENTS
2001/0016920 A1* 8/2001 Chan ........................... 714/11

2002/0010883 A1* 1/2002 Coffey et al. ................ 714/712
2003/0051194 A1* 3/2003 Cabezas et al. ............... 714/43

OTHER PUBLICATIONS
"Interrupt" "Interrupt-Driven Processing". Microsoft Computer Dictionary (Fifth Edition).2002. Microsoft Press.*

* cited by examiner

*Primary Examiner*—Bryce Bonzo
*Assistant Examiner*—Matthew Urick
(74) *Attorney, Agent, or Firm*—Young & Thompson

(57) ABSTRACT

A failure detection method enabling the detection of I/O bus failure and address parity error when installing I/O controllers connected to a system bus in a computer system, and also enabling failure location when installing units in slave/master relationships (e.g. SCSI controller and disk storage units) and when installing an additional slave in a computer system, thus improving the reliability of the system. The failure detection method comprises the steps of executing an instruction which involves providing I/O bus access to a memory to be used by an I/O controller after installed, determining that there is no failure when predetermined results are obtained with the instruction, and installing the I/O controller in the system. When the I/O controller has slave/master relationships with a plurality of slave units, the failure detection method further comprises the steps of detecting a failure in the slave units on the occasion of the installation, and notifying the host processor of the slave unit having the failure.

14 Claims, 4 Drawing Sheets

F I G. 1
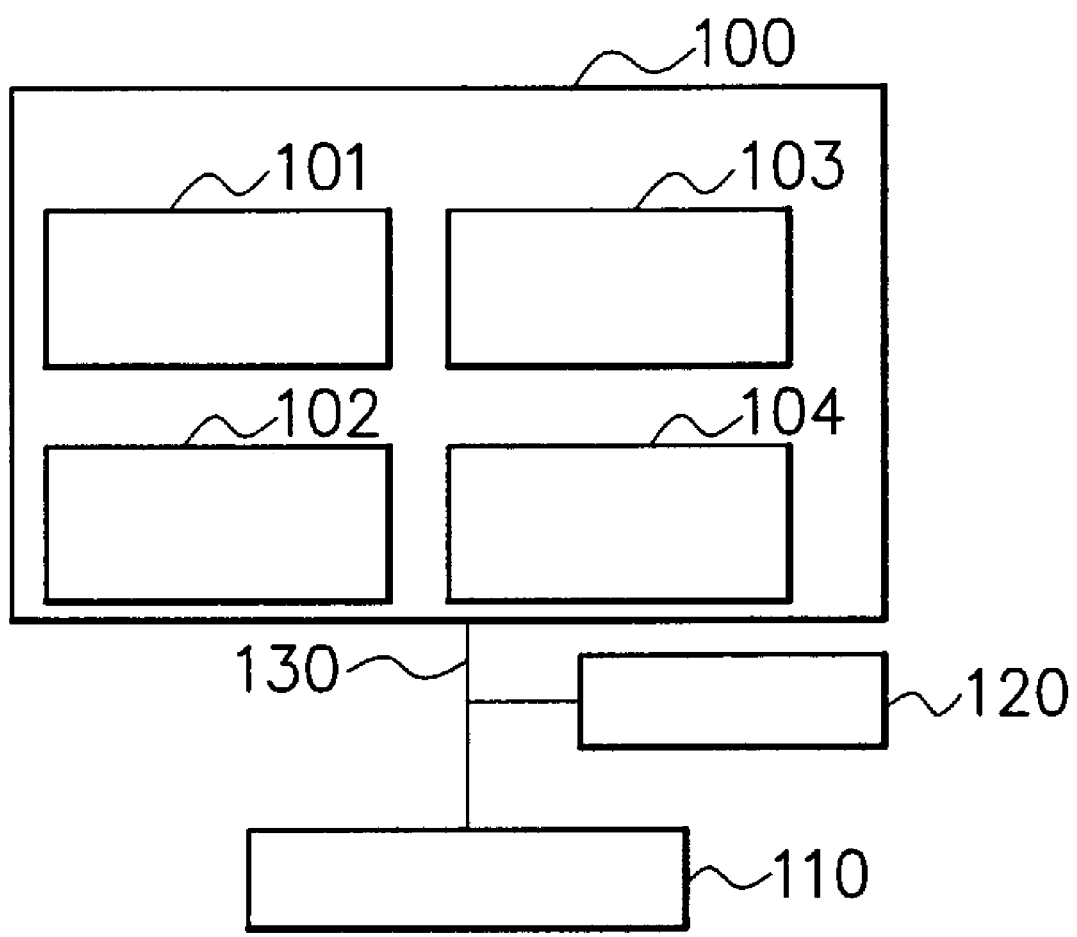

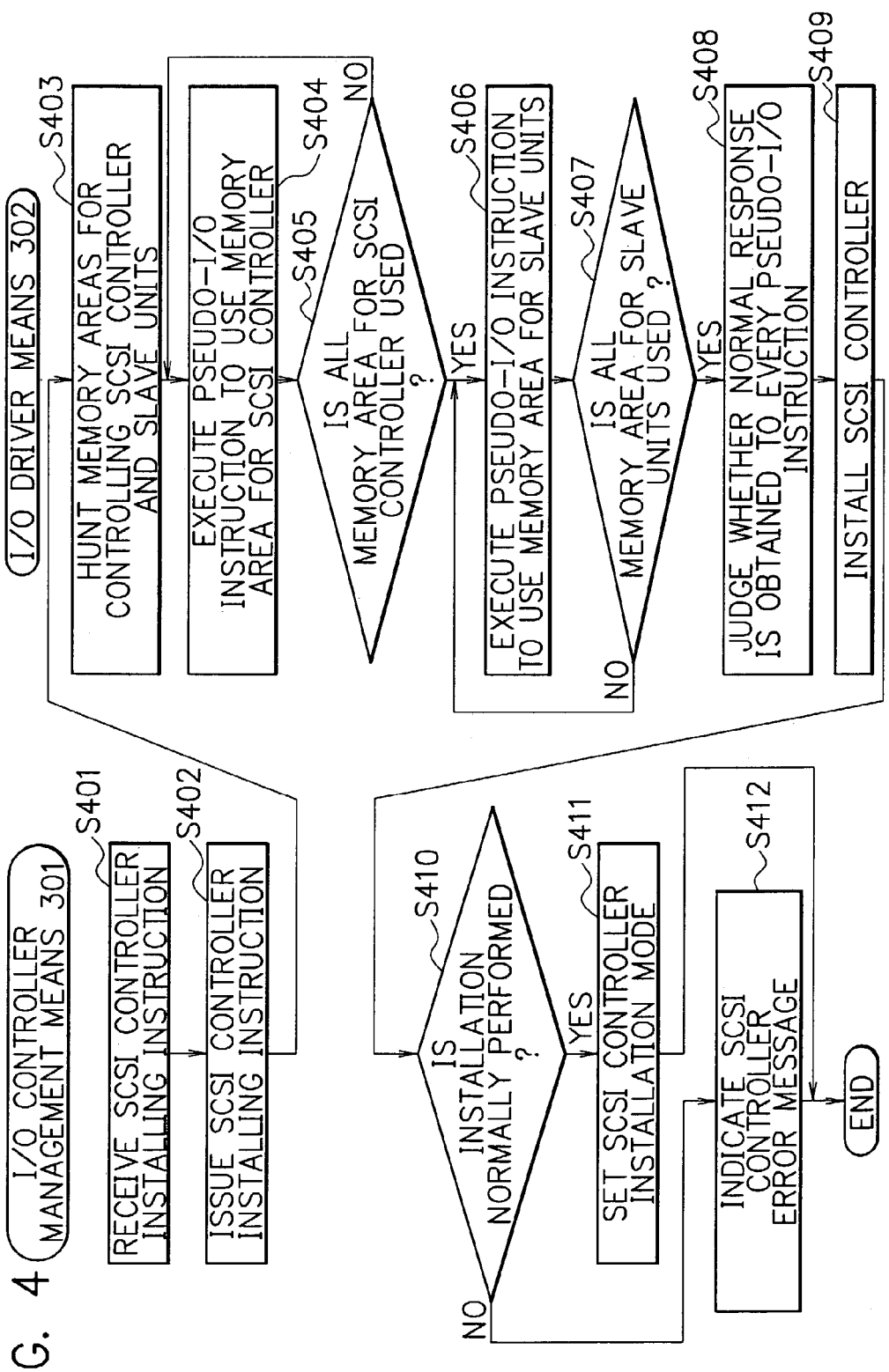

METHOD FOR DETECTING FAILURE WHEN INSTALLING INPUT-OUTPUT CONTROLLER

FIELD OF THE INVENTION

The present invention relates to a system including an input-output controller such as a SCSI (Small Computer System Interface) controller, etc. and a method for detecting a failure when installing an input-output controller.

BACKGROUND OF THE INVENTION

A computer system generally comprises a number of input-output (I/O) controllers such as a LAN controller and a SCSI controller in addition to a control section (hereinafter referred to as a processor unit) including a processor that takes a central part in the system and a memory. The processor unit is connected to other units via system buses. There have been disclosed some techniques for fault detection concerned with the system bus in Japanese Patent Applications laid open No. HEI4-8147, laid open No. HEI7-168727, and laid open No. HEI8-263328.

A SCSI port is a standard interface for connecting the peripheral equipment such as a HDD (Hard Disk Drive) with the processor unit. With the SCSI port, a SCSI controller is used as an I/O controller to be a host for communicating with a magnetic disk and the like. Techniques involved with the SCSI controller have been disclosed, for example, in Japanese Patent Applications laid open No. HEI11-203239 and laid open No. HEI11-110138.

Generally, in a conventional system, I/O controllers like the SCSI controller are installed in the system when the operation of the processor unit starts. At a restart of the processor unit or when executing an instruction from a system maintainer to install an I/O controller, only a part of memory area related to the operation of the I/O controller is used and installation processing is simply carried out during the process of the installation. After completion of the installation, necessary parts of memory area are selectively used for executing respective instructions each time when I/O access occurs in operation.

In the following, a description will be given of problems in the above-mentioned conventional techniques and systems.

The first problem is that an I/O bus access fault which occurs while using an I/O controller has an impact on the whole processor system, thus causing a system failure. This is because a fault cannot be located when the fault occurs in the I/O bus access from the I/O controller to the memory.

The second problem is that the I/O controller which has caused the failure can be reinstalled when restarting the processor. This is because normal operation is performed at the stage of installation processing since only sectional I/O bus accesses may occur when installing the I/O controller.

The third problem is that in the case where an I/O controller having slave/master relationships with plural devices (slave devices), for example, the SCSI controller and disk storage units are installed and one of the slave devices has a failure, the slave device with the failure cannot be specified.

Besides, in a system adopting a disk array, etc., there is a case where an additional disk storage unit is installed in the active system in which the SCSI controller and a disk storage unit #A have been already installed. When a SCSI controller failure is detected on such occasion and failure recovery is performed for the SCSI controller while the disk storage unit #A is in use, accessing to the disk storage unit #A is interrupted, which affects a software or program running on the system.

SUMMARY OF THE INVENTION

It is therefore an object of the present invention to provide a failure detection method enabling the detection of I/O bus failure and address parity error when installing I/O controllers such as a SCSI controller, etc. connected to a system bus in a computer system, thus improving the reliability of the system.

It is another object of the present invention to provide a failure detection method enabling failure location when installing units in slave/master relationships (e.g. SCSI controller and disk storage units) and also when installing an additional slave in a computer system, thus improving the reliability of the system.

In accordance with the first aspect of the present invention, to achieve the above objects, there is provided a failure detection method for detecting a failure at a time when installing an I/O controller in a computer system, comprising the steps of executing an instruction which involves providing I/O bus access to a memory to be used by the I/O controller after installed; determining that there is no failure when predetermined results are obtained with the instruction; and installing the I/O controller in the system.

In accordance with the second aspect of the present invention, there is provided a failure detection method for detecting a failure at a time when installing an I/O controller in a computer system, comprising the steps of: executing an instruction which involves providing I/O bus access to a memory to be used by the I/O controller after installed; determining that there is no failure when predetermined results are obtained with the instruction and installing the I/O controller in the system; and notifying a host processor that there is a failure in the I/O controller when predetermined results are not obtained with the instruction so that the host processor can specify the I/O controller with the failure.

In accordance with the third aspect of the present invention, in the first or second aspect, the failure detection method further comprises the steps of executing a micro diagnostic program stored in the I/O controller; and installing the I/O controller in the system when it is verified that there is no failure by the micro diagnostic program.

In accordance with the fourth aspect of the present invention, in one of the first to third aspects, the I/O controller has slave/master relationships with a plurality of slave units, and the failure detection method further comprises the steps of: detecting a failure in the respective slave units when installing the I/O controller; and when a failure is found in any of the slave units, notifying the host processor of the slave unit having the failure.

In accordance with the fifth aspect of the present invention, in the fourth aspect, the failure detection method further comprises the steps of: executing an instruction which involves providing I/O bus access to a memory to be used by the respective slave units after installed; determining that there is no failure when predetermined results are obtained with the instruction; and notifying the host processor of the slave unit having a failure when predetermined results are not obtained with the instruction.

In accordance with the sixth aspect of the present invention, in one of the first to fifth aspects, the I/O controller is a SCSI controller.

In accordance with the seventh aspect of the present invention, in one of the first to sixth aspects, a system maintainer is informed as to the result of the installation of the I/O controller.

BRIEF DESCRIPTION OF THE DRAWINGS

The objects and features of the present invention will become more apparent from the consideration of the following detailed description taken in conjunction with the accompanying drawings in which:

FIG. 1 is a block diagram showing the configuration of the main part of a preferred computer system for illustrating an application of the present invention;

FIG. 4 is a flowchart showing the operation process according to the second embodiment of the present invention.

DESCRIPTION OF THE PREFERRED EMBODIMENTS

Figure 2:
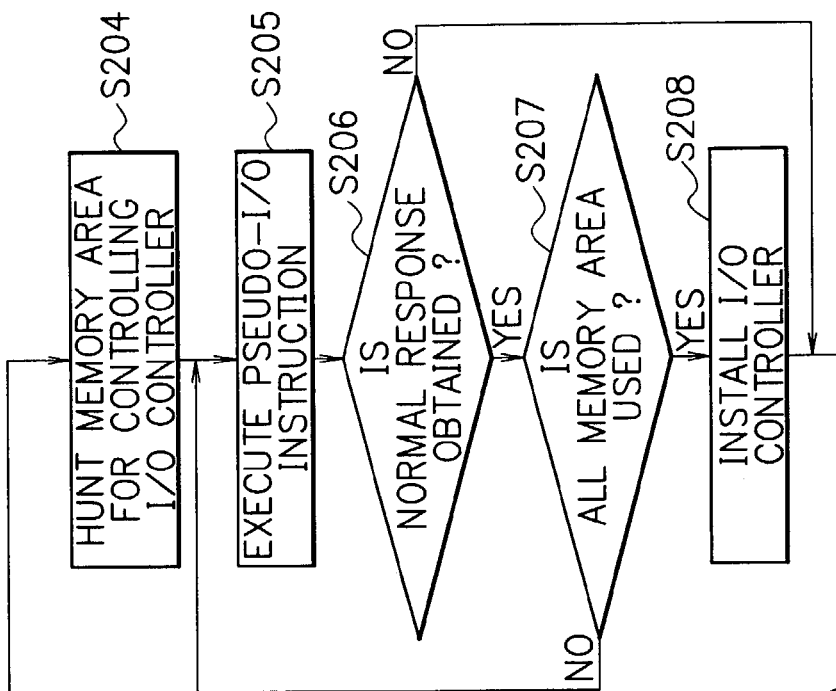
FIG. 2 is a flowchart showing the operation process according to the first embodiment of the present invention.
Figure 2:
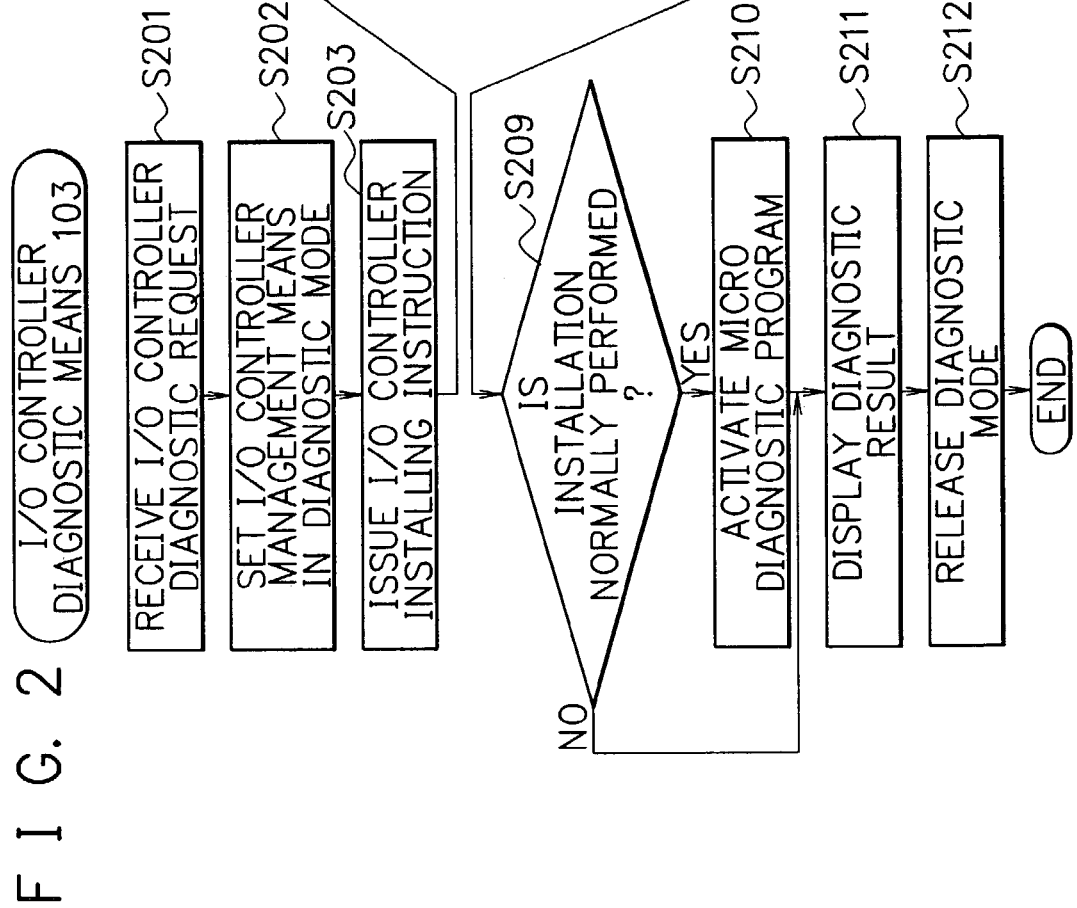

Referring now to the drawings, a description of preferred embodiments of the present invention will be given in detail.

FIG. 1 is a block diagram showing the configuration of the main part of a preferred computer system for the application of the first embodiment of the present invention. With reference to FIG. 1, the computer system comprises a processor unit 100 that operates under program control, an I/O controller 110, a memory 120, and an I/O bus 130. The I/O controller 110 may be a general-purpose I/O controller such as a SCSI controller and a LAN controller.

The processor unit 100 includes an I/O controller management means 101, an I/O driver means 102, an I/O controller diagnostic means 103, and a memory management means 104.

The I/O controller management means 101 manages the condition of the I/O controller 110. The I/O driver means 102 provides access to the I/O controller 110. The I/O controller diagnostic means 103 verifies normal operation of the I/O controller 110 preparatory for installing the I/O controller 110. The memory management means 104 manages accesses to the memory 120 from all units or sections. The respective means are generally realized from the execution of a program by the processor.

In the following, a detailed description will be given of the operation of the system according to the first embodiment of the present invention referring to FIGS. 1 and 2. When the processor unit 100 is activated, the I/O controller diagnostic means 103 receives an I/O controller diagnostic request set as part of the prescribed starting up process of the processor unit 100 (step S201 in FIG. 2). Subsequently, the I/O controller diagnostic means 103 sets the I/O controller management means 101 in diagnostic mode (step S202). The I/O controller management means 101 issues an I/O controller installing instruction to the I/O driver means 102 (step S203).

The I/O driver means 102 first hunts a memory area for control operation by the I/O controller 110 through the memory management means 104 (step S204). Then, the I/O driver means 102 executes a prescribed pseudo-I/O instruction so that bidirectional access occurs between the I/O controller 110 and the memory 120 to use a part or block of the memory area for control operation hunted previously (step S205).

Next, the I/O driver means 102 judges whether a specific normal response to the pseudo-I/O instruction has been obtained (step S206).

If the normal response has been obtained (step S206/YES), the I/O driver means 102 checks whether all the memory patterns are tried, namely, all the space in the memory area for control operation has been used (step S207). If unused memory area remains (step S207/NO), the I/O driver means 102 returns to the operation at step S205 and executes the similar pseudo-I/O instruction to use another part or block of the memory area for control operation.

The I/O driver means 102 repeats the procedure from step S205 to S207 for all the memory blocks of address space necessary for I/O bus access verification.

If the normal response has not been obtained (step S206/NO), the I/O driver means 102 stops the instillation operation, and notifies the I/O controller diagnostic means 103 that there is a failure.

The memory 120 and I/O bus 130 are verified by the judgment on whether the specific normal response to every pseudo-I/O instruction has been obtained or not as is described above.

If the normalcy of the I/O bus 130 is verified, that is, the specific normal response to every pseudo-I/O instruction has been obtained (step S207/YES), the I/O driver means 102 carries out the installation operation (step S208), and notifies the I/O controller diagnostic means 103 of the operation result.

The I/O controller diagnostic means 103 judges whether or not the installation operation has been normally performed (step S209).

If the installation operation has been normally performed (step S209/YES), the I/O controller diagnostic means 103 activates a micro diagnostic program stored in the I/O controller 110 (step S210), and indicates to the system maintainer the diagnostic result that the I/O controller 110 has been installed by display or the like (step S211). After that the I/O controller diagnostic means 103 releases the I/O controller management means 101 from the diagnostic mode (step S212).

On the other hand, if the installation operation has not been normally performed (step S209/NO), the I/O controller diagnostic means 103 indicates to the system maintainer the diagnostic result by display or the like (step S211), and releases the I/O controller management means 101 from the diagnostic mode (step S212).

In accordance with the first embodiment of the present invention, the normalcy of the I/O bus is verified when installing the I/O controller as is described above. Consequently, it is possible to detect an I/O bus failure as well as checking address parity in advance of the installation of the I/O controller, thereby preventing a failure from occurring after the installation. Thus, the reliability of the system can be improved.

In the following, the second embodiment of the present invention will be described.

Figure 3:
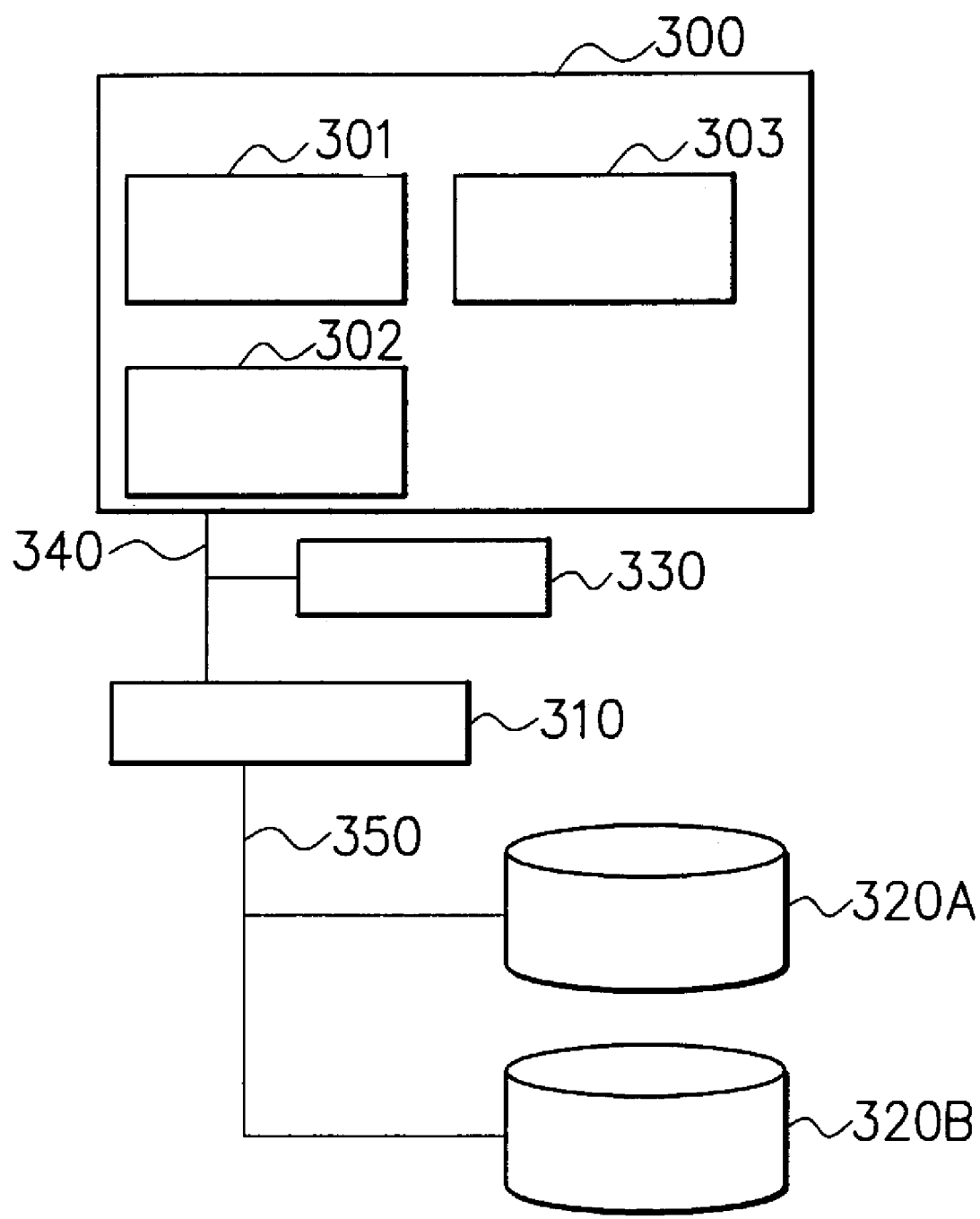
FIG. 3 is a block diagram showing the configuration of the main part of another preferred computer system for illustrating an application of the present invention.

FIG. 3 is a block diagram showing the configuration of the main part of a preferred computer system for the application of the second embodiment of the present invention. Referring to FIG. 3, the computer system comprises a processor unit 300 that operates under program control, a SCSI controller 310 as an I/O controller, disk storage units 320A and 320B as slave units of the SCSI controller 310, a memory 330, and an I/O bus 340.

The processor unit 300 includes an I/O controller management means 301, an I/O driver means 302, and a memory management means 303.

The I/O controller management means 301 sends an I/O controller installing instruction to the I/O driver means 302 at a restart of the processor unit 300 or when the system maintainer gives an instruction to install an I/O controller. The memory management means 303 manages accesses to the memory 330 from all units or sections.

Having received the I/O controller installing instruction as a trigger, the I/O driver means 302 executes an instruction so that accesses occurs from the SCSI controller 310 to the memory 330 and vice versa to verify whether bidirectional access between the controller 310 and the memory 330 can be normally gained (pre-installation check).

After obtaining the verification, the I/O driver means 302 installs the SCSI controller 310, disk storage units 320A and 320B in the system. Accordingly, it becomes possible for other controllers (not shown) to use the disk storage units 320A and 320B.

When a failure is detected by the pre-installation check, the I/O driver means 302 notifies a host processor of the failure. Thus, the host processor can specify or locate the unit with the failure.

In the following, a detailed description will be given of the operation of the system according to the second embodiment of the present invention referring to FIGS. 3 and 4. At a start or restart of the system, the I/O controller management means 301 receives a SCSI controller installing instruction set as part of the prescribed starting up process of the processor unit 300 (step S401 in FIG. 4). Incidentally, the system maintainer may input the SCSI controller installing instruction as needed while the system is in operation. The I/O controller management means 301 receives the SCSI controller installing instruction in this case as well, and conducts the same operations as follows.

Having received the SCSI controller installing instruction, the I/O controller management means 301 issues a SCSI controller installing instruction to the I/O driver means 302 (step S402).

The I/O driver means 302 first hunts memory areas for the control operation of the SCSI controller 310 and the disk storage units 320A and 320B through the memory management means 303 (step S403). Then, the I/O driver means 302 executes a pseudo-I/O instruction so that bidirectional access occurs between the SCSI controller 310 and the memory 330 to use a part or block of the memory area for the control operation of the SCSI controller 310 hunted previously (step S404).

Next, the I/O driver means 302 checks whether all the space in the memory area for control operation of the SCSI controller 310 has been used (step S405). If unused memory area remains (step S405/NO), the I/O driver means 302 returns to the operation at step S404 and executes the similar pseudo-I/O instruction to use another part or block of the memory area for control operation of the SCSI controller 310. The I/O driver means 302 repeats this until all the memory address space necessary for I/O bus access verification has been used.

If all the space in the memory area for control operation of the SCSI controller 310 has been used (step S405/YES), the I/O driver means 302 executes a pseudo-I/O instruction to use a part or block of the memory area for control operation of the disk storage units 320A and 320B hunted previously (step S406).

Similarly, the I/O driver means 302 checks whether all the space in the memory area for control operation of the disk storage units 320A and 320B has been used (step S407). If unused memory area remains (step S407/NO), the I/O driver means 302 returns to the operation at step S406 and executes the similar pseudo-I/O instruction to use another part or block of the memory area for control operation of the disk storage units 320A and 320B. The I/O driver means 302 repeats this until all the memory address space for controlling the disk storage units 320A and 320B necessary for I/O bus access verification has been used.

If all the space in the memory area for control operation of the disk storage units 320A and 320B has been used (step S407/YES), the I/O driver means 302 judges whether the specific normal response to every pseudo-I/O instruction has been obtained to verify the normalcy of the I/O bus 340 (step S408). If there is a failure, the failure can be located and the unit concerned with the failure is found out on this occasion.

Following the operation of step S408, the I/O driver means 302 installs the SCSI controller 310 in the system (step S409), and notifies the I/O controller management means 301 of the operation result.

The I/O controller management means 301 judges whether or not the installation operation has been normally performed (step S410).

If the installation operation has been normally performed (step S410/YES), the I/O controller management means 301 sets the SCSI controller 310 in an installed mode (step S411). On the other hand, if a failure is found at step S408, or the installation operation has not been normally performed (step S410/NO), the I/O controller management means 301 indicates an error message to notify the system maintainer that maintenance is required for the SCSI controller 310 (step S412).

In accordance with the second embodiment of the present invention, the normalcy of the I/O bus is verified when installing the SCSI controller as is described above. Consequently, it is possible to detect an I/O bus failure as well as checking address parity in advance of the installation of the SCSI controller, thereby preventing a failure from occurring after the installation. Thus, the reliability of the system can be improved.

Moreover, a pseudo-I/O instruction is intentionally conducted so as to let I/O bus failure occur if any and to know the unit concerned with the failure. Thus, the unit that may have the failure can be specified when installing units in slave/master relationships (e.g. SCSI controller and disk storage units).

Besides, with the conventional system that does not verify the normalcy of the I/O bus, in the case where a SCSI controller failure is detected when a disk storage unit #B is additionally installed in the active system in which the SCSI controller and a disk storage unit #A have been already installed, failure recovery is performed for the SCSI controller even when the disk storage unit #A is in use. Consequently, accessing to the disk storage unit #A is interrupted, which affects a software or program running on the system. However, according to the present invention, it is possible to avoid such inconvenience since the SCSI controller failure is detected when installed.

While the present invention has been described with reference to the particular illustrative embodiments, it is not to be restricted by the embodiments but only by the appended claims. It is to be appreciated that those skilled in the art can change or modify the embodiment without departing from the scope and spirit of the present invention.

What is claimed is:

1. A method of detecting a failure when installing an I/O controller in a computer system having a processor and a memory connected to the I/O controller, the method comprising the steps of:

when starting installation of the I/O controller, the processor searching the memory for memory blocks related to operation of the I/O controller, the processor testing each of the memory blocks related to operation of the I/O controller by executing a pseudo-I/O instruction in which bidirectional communication occurs between the I/O controller and a respective one of the memory blocks, and the processor evaluating a response to the pseudo-I/O instruction, so long as the response received by the processor is normal, the processor repeating the testing step until all memory blocks related to operation of the I/O controller have been tested, and then installing the I/O controller, and when the response received by the processor is abnormal, stopping the testing step and stopping installation of the I/O controller.

2. The method of claim 1, wherein installing the I/O controller comprises the steps of executing a micro diagnostic program stored in the I/O controller, and completing installation of the I/O controller when no failure is detected by the micro diagnostic program.

3. The failure detection method claimed in claim 1, wherein the I/O controller has slave/master relationships with a plurality of slave units, the method further comprising the steps of:

detecting a failure in the respective slave units when installing the I/O controller; and when a failure is found in any of the slave units, notifying the processor of the slave unit having the failure.

4. The failure detection method claimed in claim 3, further comprising the steps of informing a system maintainer as to the result of the installation of the I/O controller.

5. The failure detection method claimed in claim 1, wherein the I/O controller has slave/master relationships with a plurality of slave units, further comprising the steps of:

executing an instruction which involves providing access to a memory to be used by the respective slave units after installed;

determining that there is no failure when predetermined results are obtained with the instruction; and notifying the processor of the slave unit having a failure when predetermined results are not obtained with the instruction.

6. The failure detection method claimed in claim 5, further comprising the steps of informing a system maintainer as to the result of the installation of the I/O controller.

7. The failure detection method claimed in claim 1, further comprising the steps of informing a system maintainer as to the result of the installation of the I/O controller.

8. A method of detecting a failure when installing an I/O controller in a computer system having a processor and a memory connected to the I/O controller through an I/O bus, the processor having an I/O diagnostic device, an I/O management device, and an I/O driver, the method comprising the steps of:

the I/O diagnostic device setting the I/O management device in a diagnostic mode;

the I/O management device issuing an I/O controller installation instruction to the I/O driver;

the I/O driver, via the I/O bus, searching the memory for memory blocks related to operation of the I/O controller, the I/O driver, via the I/O bus, testing each of the memory blocks related to operation of the I/O controller by executing a pseudo-I/O instruction in which bidirectional communication occurs between the I/O controller and a respective one of the memory blocks via the I/O bus, with the I/O driver evaluating a response to the pseudo-I/O instruction, so long as the response received by the I/O driver is normal, the I/O driver repeating the testing step until all memory blocks related to operation of the I/O controller have been tested, and then installing the I/O controller, and when the response the I/O driver receives is abnormal, stopping the testing step and stopping installation of the I/O controller.

9. The method of claim 8, wherein installing the I/O controller comprises the steps of executing a micro diagnostic program stored in the I/O controller, and completing installation of the I/O controller when no failure is detected by the micro diagnostic program.

10. The failure detection method claimed in claim 8, wherein the I/O controller has slave/master relationships with a plurality of slave units, further comprising the steps of:

detecting a failure in the respective slave units when installing the I/O controller; and when a failure is found in any of the slave units, notifying the processor of the slave unit having the failure.

11. The failure detection method claimed in claim 10, further comprising the steps of informing a system maintainer as to the result of the installation of the I/O controller.

12. The failure detection method claimed in claim 8, wherein the I/O controller has slave/master relationships with a plurality of slave units, further comprising the steps of:

executing an instruction which involves providing I/O bus access to a memory to be used by the respective slave units after installed;

determining that there is no failure when predetermined results are obtained with the instruction; and notifying the processor of the slave unit having a failure when predetermined results are not obtained with the instruction.

13. The failure detection method claimed in claim 12, further comprising the steps of informing a system maintainer as to the result of the installation of the I/O controller.

14. The failure detection method claimed in claim 8, further comprising the steps of informing a system maintainer as to the result of the installation of the I/O controller.

* * * * *